United States Patent Office 3,513,212
Patented May 19, 1970

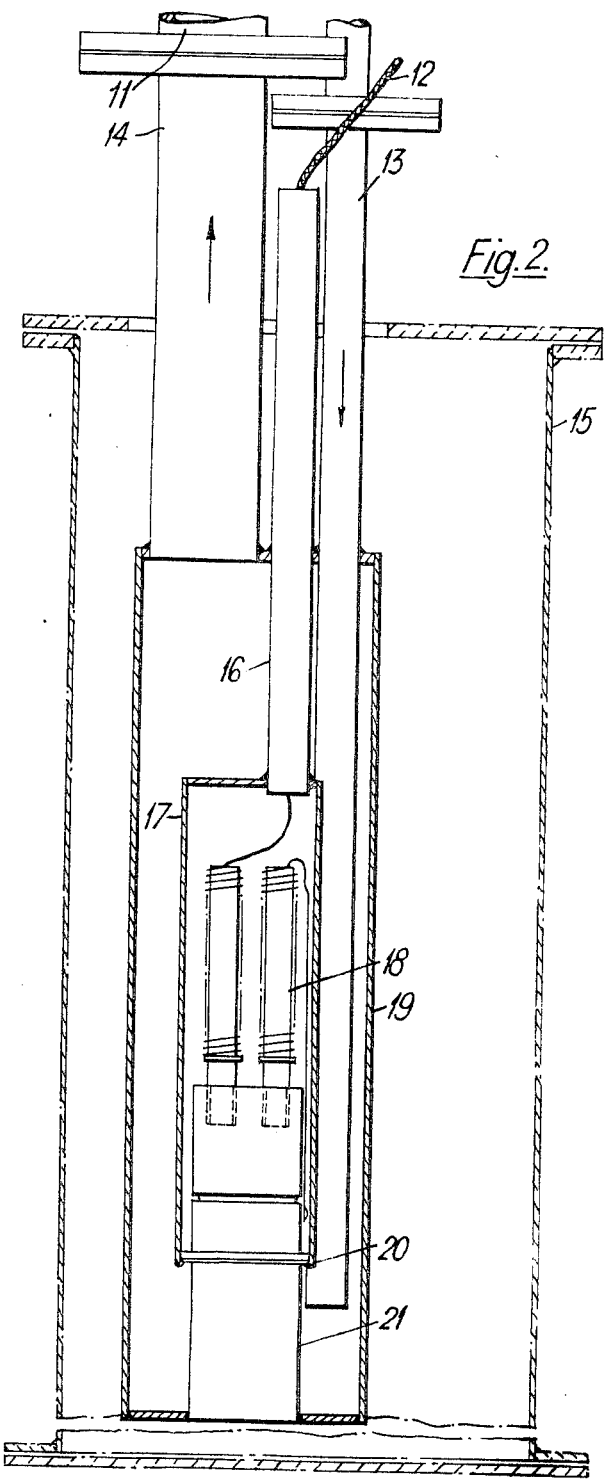

3,513,212
RECOVERY OF PARAXYLENE CRYSTALS
UNDER REFRIGERATION AND SONIC
VIBRATION CONDITIONS
Jerzy Konrad Skrebowski and John Williamson, Norton-on-Tees, England, assignors to Imperial Chemical Industries Limited, Millbank, London SW. 1, England, a corporation of Great Britain
Filed Aug. 15, 1966, Ser. No. 572,420
Claims priority, application Great Britain, Aug. 18, 1965, 35,367/65
Int. Cl. B01d 9/04
U.S. Cl. 260—674
8 Claims

ABSTRACT OF THE DISCLOSURE

Liquid comprising paraxylene and at least one other compound selected from other xylenes and ethyl benzene is contacted with a chilled surface which is subjected to sonic vibrations to produce a slurry comprising crystals of the paraxylene and the mother liquor.

Figure 1:
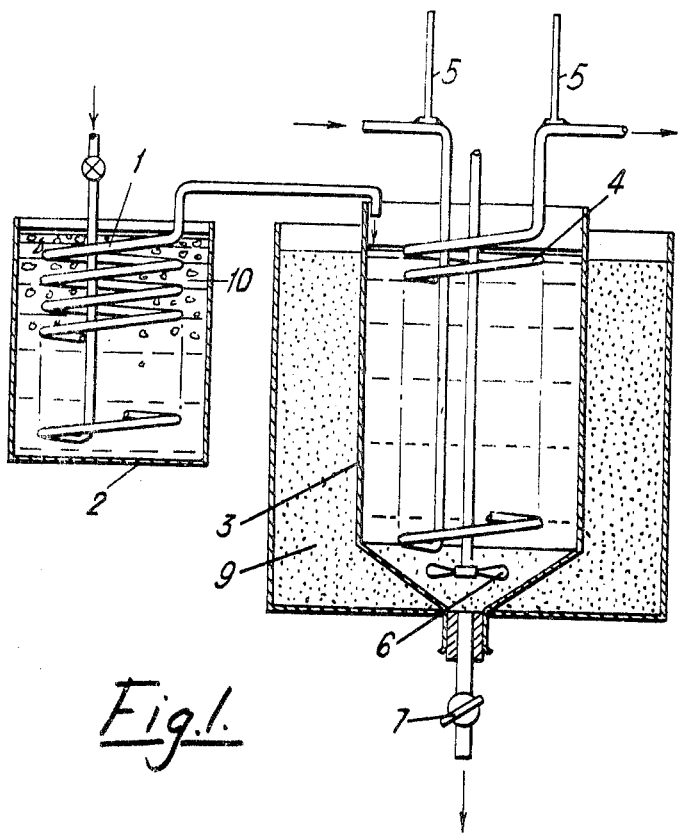

This invention is concerned with refrigeration processes.

In processes for freezing liquids comprising paraxylene and at least one other xylene and/or ethyl benzene, to produce slurries comprising a mother liquor and crystals of paraxylene, by contacting them with a chilled surface, there is a tendency to build up solid deposits on the chilled surface, which results in inefficient heat transfer and failure to recover the crystal products rapidly from the system. It has previously been proposed to provide mechanical scrapers to clean the surface, but such systems are often expensive to maintain and produce slurries containing mainly small paraxylene crystals. We have now devised means whereby the problem may be significantly reduced.

The invention provides a process of freezing a liquid comprising paraxylene and at least one other xylene and/or ethyl benzene to produce a slurry comprising crystals of paraxylene and a mother liquor, in which process the said liquid is contacted with a chilled surface whilst subjecting the surface to sonic vibrations at a sufficient power to prevent the building up of incrustations. (The term "sonic vibrations" in this application includes vibrations above the audible range.) The frequency of the vibrations is at least 40 cycles per second and is preferably in the range of 0.5 to 100 kilocycles per second. Suitably, vibrations of a low frequency of from 5, and preferably 10, to 30 kilocycles per second are used as these tend to produce a high turbulence in the layer of liquid close to the cooling surface and tend also to be easily produced at a high power.

It is preferred that the liquid comprises at least 10% and preferably from 15% to 85% by weight of paraxylene.

The chilled surface is suitably a thermally conductive barrier separating the liquid to be chilled from a refrigerant liquid.

We have found that the process of this invention permits at the same rate of heat exchange and under the same process conditions, the production of larger crystals than is possible if only mechanical scraping is used to free the surface of crystal deposits. We have also found that a higher rate of heat exchange can be achieved with the same temperature difference between the chilled surface and the liquid, and that the said temperature difference may be considerably greater, than when a mechanical scraper is used.

Suitable chilled surfaces may be provided, for example, by using one or more tubes of which the walls form thermally conductive barriers, the said tubes either conducting the liquid to be chilled through a bath of refrigerant or most preferably conducting a refrigerant through a vessel containing the liquid to be chilled. Such tubes should preferably have an internal diameter of not less than one quarter and more preferably not less than half an inch.

It is preferred that the tubes should be coiled, as it has been less easy to vibrate straight tubes, and the use of coils is generally more efficient. It is preferred that the tubes should be only flexibly connected (for example by means of bellows) to other parts of the apparatus, in order to reduce the loss of vibrational energy.

Plate and corrugation heat exchangers may also be used.

Refrigerants for cooling the chilled surface may be cooled in any refrigeration device, which may be of conventional design. The refrigerant may be for example, ammonia, ethylene, ethane or carbon dioxide. Suitable refrigerants however when only moderately decreased temperatures are required are brine, petrol, methanol and acetone, or preferably a pentane, for example, n-pentane.

A member of the refrigerants for chilling the surface (for example ammonia, ethylene, ethane and carbon dioxide) normally evaporate in the chilling process, and thus produce a "boiling" effect, though this can be suppressed by using high pressures. Refrigerants of this type are particularly appropriate for the production of low temperatures, which are used in the treatment of mixtures containing only small concentrations (for example, of 10%–30%, and more usually 15%–25% by weight) of p-xylene.

Refrigerants of this type may for example, when they are allowed to boil, be passed through cooling coils which have a large internal diameter (normally at least 1.5 inches), the cooling coils being immersed in the liquid being treated and vibrated by sonic waves. If a sufficient pressure is maintained within the tubes to prevent boiling in the coils, tubes having smaller internal diameter, for example ¼ inch, may be used; the refrigerant may be re-chilled after use by allowing it partly to evaporate.

We have found that a particularly simple technique, in which boiling of the refrigerant is advantageous and which is very effective, is to feed the refrigerant to one or more fingers, i.e. closed ended tubes, which are surrounded by a vessel containing the liquid to be frozen, and are vibrated preferably from at or near their closed ends. The source of vibration may be located inside the finger, and may be isolated from direct contact with the refrigerant by being situated in an enclosed compartment. Alternatively, the source of vibration may be outside the finger. Each finger preferably extends horizontally or more preferably downwardly so as to facilitate the flow of refrigerant into it and it should clear the bottom of the vessel so as to avoid interference with settled crystals.

Whilst the finger may be secured rigidly at its open end, suitably by means of a flange, to other parts of the apparatus, for example the vessel containing liquid undergoing treatment, the finger may also with advantage be flexibly supported by said other parts of the apparatus so as to reduce leakage of sonic energy. This may be achieved, for example, by providing the open end of the finger with an external flange which rests on resilient supports which may be borne by the vessel. The finger may be fed with refrigerant through a bellows, though if the losses of sonic energy are acceptable, a simple construction when a downwardly extending finger is used, is to unite the open end of the finger to a refrigerant reservoir.

The refrigerant may be pumped to the bottom of the finger through an internal tube, but this is normally unnecessary with downwardly extending fingers as, if the tube has a sufficient diameter (for many purposes an internal diameter of 4 inches is ample if the finger is, for example, five feet long), liquid refrigerant flows into the tube under the influence of gravity at a quite satisfactory rate despite the effect of boiling.

The use of fingers, as described above, offers considerable advantages over systems in which two concentric tubes are used, one tube conducting the boiling refrigerant and the other one containing the liquid being treated, as in systems of the latter type it is usually found necessary to insulate acoustically at least one end of the inner tube from the outer tube, so as to avoid undue loss of sonic energy.

In general, the formation of p-xylene crystals occurs most satisfactorily on convex surfaces; when fingers, as above described, are used it is therefore preferred that substantially the whole of the external tube surface should be convex, through for ease of fabrication it is sometimes preferred that the finger should be a cylindrical tube with a flat bottom.

Suitable chilled surfaces are of any metal resistant to the temperatures employed in the process, having a high thermal conductivity and a low attenuation of the sonic vibration, for example, aluminium and its alloys, many copper alloys, especially the copper/beryllium alloys and brass, but preferably steels, for example stainless steel.

It is necessary to couple the surface to a source of sonic vibrations through solids, and preferably metals, rather than to transmit the waves to the surface through the liquid to be chilled.

It is also preferred that the sonic vibration should be applied longitudinally with respect to the surface, as this has been found to require in general a lower power of vibration than is required in other orientations.

The source of the sonic vibrations may be for example a piezoeectric device or a generator for electric current at a frequency of from 0.5 to 100 kilocycles per second, together with a coil connected across the generator and surrounding a core of magneto-strictive material, one end of the core being coupled either directly or indirectly, for example through a velocity transformer to amplify the vibrations, to the thermally conductive barrier.

Coupling of the core and/or velocity transformer to a vibrating part of the apparatus may be achieved by welding.

Preferably the sonic vibrations have a power of, for example, 5 to 200 watts per square foot of the chilled surface. In general at least 10 watts per square foot and at most 100 watts per square foot are usually used.

The chilled surface may be at a temperature in the range of 0.5 to 30 or even 50 centigrade degrees and preferably 5 to 20 centigrade degrees below the temperature of the liquid being chilled at its crystallisation point. A preferable temperature difference is 10 to 15° C. In general, the greater the temperature difference, the greater the power of the sonic vibration required. The greater the concentration of p-xylene, the smaller the temperature difference which is practical.

It is desirable that the liquid should be flowed across the chilled surface, for example by stirring. It is preferred that the linear flow rate should be at least six inches per second, and that flow should be turbulent.

According to one form of the invention, a plurality of sources of sonic vibration are employed. If these are positioned near to one another it is advantageous that they should be operated in phase with one another but if they are separated from one another by a sufficient distance, it is immaterial whether they are in phase or not.

It is most desirable that sonic vibrations should be applied to the chilled surface continuously during the process in order to prevent the build up of incrustations, as these are difficult to remove once they have built up.

By the use of this process, slurries containing 50% or more by weight of solids may be produced, though for handling purposes slurries containing at most 40% by weight of solids are normally preferred.

In all forms of the invention it is preferred when the weight of vibrating parts of the apparatus is supported rigidly, to provide the support at nodal points, if such points exist.

The paraxylene of the crystals may be recovered by any suitable method, for example, by filtration, but is very conveniently separated by centrifuging the slurry.

One form of the invention will now be described with reference to the accompanying drawings, of which FIG. 1 shows the use of a chilling coil and FIG. 2 shows the use of fingers.

FIG. 1 shows a prechilling coil 1 of half an inch internal diameter, 10 ft. long formed into a helix of five inches diameter, surrounded by a vessel 2 containing ice and water 10, leading to a main refrigeration vessel 3 of 2 gallons capacity surrounded by verimculite insulation 9 and having a conical base at the apex of which is an outlet tap 7. The vessel 3 contains a refrigeration coil 4 of half an inch internal diameter copper tube 15 ft. long in the form of a helix having a diameter of five inches. The refrigeration coil 4 is connected by means of bellows (not shown) at both inlet and outlet into a circuit (also not shown) for passing refrigerant through it. To both the inlet and the outlet sides of the coil 4 ultrasonic transducers 5 are welded so as to transmit vibrations in the direction of the axis of the tube. A stirrer 6 is provided in the vessel 3.

In operation, a mixture of isomeric xylenes and ethyl benzene containing 70% by weight of paraxylene is fed through the coil 1 at a rate of 18 litres per hour, and is discharged into the main refrigeration vessel 3 at a temperature of 3°–4° C. Methanol is fed through the refrigeration coil 4 at a rate of 300 litres per hour, its inlet temperature being —17° C. and its outlet temperature —13° C., whilst the transducers are continuously operated at a frequency of 13 kilocycles per second and at an electrical power of 40 watts each, giving an estimated total delivery of 50 watts of ultrasonic power to the coil. The stirrer 6 was operated at a sufficient rate to prevent any substantial proportion of the crystals settling.

Periodically a slurry comprising 40 to 50% by weight of paraxylene crystals was run off through the tap 7. The average crystal size was found to be 340 microns, with a standard deviation of 140 microns. The yield of crystals per square foot of external coil surface was found to be 10 kg. per hour.

The slurry produced was centrifuged in a centrifuge positioned below the tap 7, to recover crystalline paraxylene.

The invention will now be further described with reference to FIG. 2 of the accompanying drawings.

A vessel 15 surrounds two cylindrical fingers of 4½ inch external diameter 5 ft. long 19 (only one shown), of which in each case the bottom is welded to an internal velocity head 21 to the top of which are welded two ultrasonic transducers 18. A capsule 17 surrounds the transducers and is welded to the velocity head 21 at a nodal point 20. A tube 16 is let into the top of the capsule to act as a conduit for an electric cable 12.

A tube 13 for introducing refrigerant to the finger leads to the base of the finger, and has an external flange at its top. A second tube 14, also having an external flange at its top, is provided for allowing the escape of refrigerant vapour. Bellows (not shown) provided with flanged extensions 11, are united with the pipes 13 and 14 through their flanges. The weight of the finger 19 and its contents is borne on resilient supports (not shown) which support the flanges of both tube 13 and tube 14. A loose fitting lid covers the mouth of vessel 15 in order to exclude dust.

The vessel 15 was filled with 500 litres of mixed xylenes containing 20.5% by weight of paraxylene, and 100 litres per hour of fresh feed was introduced, an equal quantity of xylenes being withdrawn. Each finger was fed with liquid ethylene which was allowed to boil, the rate of boiling, and thus the temperature, being controlled by adjusting the pressure of the ethylene.

The xylenes were cooled at a rate of 8° C. per hour until a temperature of −40° C. was reached, at which crystallisation commenced, after which they were cooled at a rate of 4° C. per hour for 2 hours, following which the temperature was kept constant; the temperature of the refrigerant was maintained at −60° C. from the onset of crystallisation.

Ultrasonic vibration at a frequency of 13 kilocycles per second and at a power (based on electrical input) of 300 watts per finger (equal to a probable sonic energy of 200 watts per finger) was applied throughout.

Throughout the experiment the xylenes were stirred at 150 revolutions per minute by one 14 inch and two 7 inch 4 blade paddles mounted on a common shaft.

Slurry withdrawn during the final hour of the experiment contained 6% of p-xylene crystals by weight, the mean crystal size being about 300 microns. The crystals were centrifuged in a high speed centrifuge and washed with pentane. The crystals were then melted and the pentane distilled off to leave a product containing over 99.5% by weight of p-xylene.

We claim:
1. A process of freezing a liquid comprising paraxylene and at least one other compound selected from the group consisting of the other isomeric xylenes and ethyl benzene to produce a slurry comprising crystals of paraxylene and mother liquor in which process said slurry is produced by contacting said liquid in a refrigeration vessel with a chilled surface at a temperature between 0.5 to 50° C. below the temperature of said liquid at its crystallization point, and subjecting the chilled surface to sonic vibrations of from 0.5 to 100 kilocycles per second so as to prevent the building up of incrustations on said surface.

2. A process as claimed in claim 1 in which the sonic vibrations have a frequency in the range of 10 to 30 kilocycles per second.

3. A process as claimed in claim 1 in which the chilled surface is in the form of one or more coiled tubes of which the walls form thermally conductive barriers, and a refrigerant is passed through the tubes.

4. A process as claimed in claim 1 in which a refrigerant is fed into at least one tube having one end closed, the tube is vibrated at the closed end, and the liquid to be frozen is contacted with the outer surface of the tube.

5. A process as claimed in claim 1 in which the sonic vibration is applied longitudinally with respect to the surface.

6. A process as claimed in claim 1 in which the sonic vibrations have a power of 5 to 200 watts per square foot of the chilled surface.

7. A process as claimed in claim 1 in which, when the liquid being chilled is at its crystallisation point the temperature of the chilled surface is from 5 to 20 centigrade degrees below the temperature of the liquid.

8. A process as claimed in claim 1 in which the liquid is flowed across the chilled surface at a linear flow rate of at least 6 inches per second, the flow being turbulent.

References Cited

UNITED STATES PATENTS

| | | | |
|---|---|---|---|
| 2,514,797 | 7/1950 | Robinson | 34—5 |
| 2,614,134 | 10/1952 | Powers | 260—674 X |
| 2,701,266 | 2/1955 | Coats | 260—674 |
| 2,769,852 | 11/1956 | Paulson | 62—58 X |
| 2,794,840 | 6/1957 | Vela | 62—58 X |
| 2,815,364 | 12/1957 | Green | 260—475 |
| 2,816,938 | 12/1957 | Hess | 62—58 X |
| 2,846,292 | 8/1958 | Harper | 23—273 |
| 3,261,170 | 7/1966 | McCarthy et al. | 260—674 X |
| 3,389,974 | 6/1968 | Barattini et al. | 23—295 |
| 3,395,547 | 8/1968 | Stoller | 62—58 |
| 3,266,263 | 8/1966 | Pollock | 62—58 |

FOREIGN PATENTS 808,176  1/1959  Great Britain.

WILBUR L. BASCOMB, JR., Primary Examiner

F. E. DRUMMOND, Assistant Examiner

U.S. Cl. X.R.

23—295; 62—58